United States Patent
Jeong et al.

(10) Patent No.: US 8,345,405 B2
(45) Date of Patent: Jan. 1, 2013

(54) MULTILAYER CERAMIC CAPACITOR

(75) Inventors: Ji Hun Jeong, Gyunggi-do (KR); Hyo Jung Kim, Gyunggi-do (KR); Hyo Jung Kim, Seoul (KR); Dong Ik Chang, Gyunggi-do (KR); Doo Young Kim, Gyunggi-do (KR)

(73) Assignee: Samsung Electronics Co., Ltd., Seoul (KR)

( * ) Notice: Subject to any disclaimer, the term of this patent is extended or adjusted under 35 U.S.C. 154(b) by 229 days.

(21) Appl. No.: 12/768,993

(22) Filed: Apr. 28, 2010

(65) Prior Publication Data

US 2011/0141655 A1 Jun. 16, 2011

(30) Foreign Application Priority Data

Dec. 10, 2009 (KR) .................. 10-2009-0122195

(51) Int. Cl.
*H01G 4/06* (2006.01)
(52) U.S. Cl. ..................... 361/311; 361/321.1
(58) Field of Classification Search .... 361/321.1–321.5, 361/311; 501/137–139
See application file for complete search history.

(56) References Cited

U.S. PATENT DOCUMENTS

| | | | | |
|---|---|---|---|---|
| 7,635,519 B2 * | 12/2009 | Onoue et al. | ............... | 428/411.1 |
| 2002/0055571 A1 | 5/2002 | Hirano et al. | | |
| 2010/0201473 A1 | 8/2010 | Konoue et al. | | |

FOREIGN PATENT DOCUMENTS

| | | |
|---|---|---|
| JP | 09-129487 A | 5/1997 |
| JP | 10-106881 | 4/1998 |
| JP | 11-067575 A | 3/1999 |
| JP | 2002-255655 A | 9/2002 |
| JP | 2003-309039 A | 10/2003 |
| JP | 2005-159056 | 6/2005 |
| JP | 2007-142342 | 6/2007 |
| JP | 2007-173480 A | 7/2007 |
| JP | 2007-266223 A | 10/2007 |
| WO | WO 2009/034824 A1 | 3/2009 |

OTHER PUBLICATIONS

Korean Office Action, w/ English translation thereof, issued in Korean Patent Application No. KR 10-2009-0122195 dated Mar. 28, 2011.
Japanese Office Action, w/ English translation thereof, issued in Japanese Patent Application No. 2010-107564, dated Dec. 20, 2011.
Japanese Office Action, and English translation thereof, issued in Japense Patent Application No. 2010-107564 dated Jun. 19, 2012.

* cited by examiner

*Primary Examiner* — Eric Thomas
(74) *Attorney, Agent, or Firm* — McDermott Will & Emery LLP

(57) ABSTRACT

Disclosed is multilayer ceramic capacitor. The multilayer ceramic capacitor includes a capacitive part including dielectric layers and first and second internal electrodes alternately laminated therein, wherein the dielectric layers include first ceramic particles having an average particle size of 0.1 μm to 0.3 μm, and one set of ends of the first internal electrodes and one set of ends of the second internal electrodes are exposed in a lamination direction of the dielectric layers, a protective layer formed on at least one of top and bottom surfaces of the capacitive part, including second ceramic particles and having a porosity of 2% to 4%, wherein an average particle size ratio of the second ceramic particles to the first ceramic particles ranges from 1.1 to 1.3; and first and second external electrodes electrically connected to the first and second internal electrodes exposed in the lamination direction of the dielectric layers.

5 Claims, 2 Drawing Sheets

MULTILAYER CERAMIC CAPACITOR

CROSS-REFERENCE TO RELATED APPLICATIONS

This application claims the priority of Korean Patent Application No. 10-2009-0122195 filed on Dec. 10, 2009, in the Korean Intellectual Property Office, the disclosure of which is incorporated herein by reference.

BACKGROUND OF THE INVENTION

1. Field of the Invention

The present invention relates to a multilayer ceramic capacitor, and more particularly, to a multilayer ceramic capacitor having a high level of reliability and a low crack occurrence rate by reducing stress acting on the multilayer ceramic capacitor.

2. Description of the Related Art

In general, electronic components using a ceramic material, such as capacitors, inductors, piezoelectric devices, varistors or thermistors, include a ceramic body formed of a ceramic material, internal electrodes provided inside the ceramic body, and external electrodes installed on the surface of the ceramic body.

Multilayer ceramic capacitors among such ceramic electronic components include a plurality of laminated dielectric layers, internal electrodes interleaved with the dielectric layers, and external electrodes electrically connected to the internal electrodes.

Multilayer ceramic capacitors are being widely used as a part of mobile communications devices, such as computers, personal digital assistants (PDA) and mobile phones, due to their small size, high capacity and ease of mounting.

Recently, as electronic products have become compact and multi-functional, chip components have also tended to become compact and highly functional. Following this trend, a multilayer ceramic capacitor is required to be smaller than ever before, but to have a high capacity.

As for a general method of manufacturing a multilayer ceramic capacitor, ceramic green sheets are manufactured and a conductive paste is printed on the ceramic green sheets to thereby form internal electrode layers. Tens to hundreds of such ceramic green sheets, provided with the internal electrode layers, are then laminated to thereby produce a green ceramic laminate. Thereafter, the green ceramic laminate is pressed at high pressure and high temperature and subsequently cut into green chips. Thereafter, the green chip is subjected to plasticizing, firing and polishing processes, and external electrodes are then formed thereon, thereby completing a multilayer ceramic capacitor.

Typically, the internal electrodes, formed of metal, shrink and expand easily as compared to ceramic materials. Thus, stress caused by this difference in thermal expansion coefficient may act on the ceramic laminate, thereby causing cracks.

The multilayer ceramic capacitor is used while mounted on a wiring board. In this case, the external electrodes of the multilayer ceramic capacitor are electrically connected to the wiring board by soldering and a conductive land on the wiring board. When the multilayer ceramic capacitor is mounted on the wiring board by using soldering, or when the wiring board mounted with the multilayer ceramic capacitor undergoes a cutting process, thermal impact and shear stress are applied to the multilayer ceramic capacitor. Such thermal impact and shear stress may cause cracks in the multilayer ceramic capacitor.

As the multilayer ceramic capacitor has recently become smaller in size and higher in capacitance, many attempts have been made to manufacture a thinner and multilayer ceramic body. However, as the ceramic body has become thinner and multilayered, a crack occurrence rate has increased. Therefore, there is an increasing need for preventing this increase in the crack occurrence rate therein.

SUMMARY OF THE INVENTION

An aspect of the present invention provides a multilayer ceramic capacitor capable of achieving a high level of reliability and a low crack occurrence rate by reducing stress acting on the multilayer ceramic capacitor.

According to an aspect of the present invention, there is provided a multilayer ceramic capacitor including: a capacitive part including dielectric layers and first and second internal electrodes alternately laminated therein, wherein the dielectric layers include first ceramic particles having an average particle size of 0.1 µm to 0.3 µm, and one set of ends of the first internal electrodes and one set of ends of the second internal electrodes are exposed in a lamination direction of the dielectric layers; a protective layer formed on at least one of top and bottom surfaces of the capacitive part, including second ceramic particles and having a porosity of 2% to 4%, wherein an average particle size ratio of the second ceramic particles to the first ceramic particles ranges from 1.1 to 1.3; and first and second external electrodes electrically connected to the first and second internal electrodes exposed in the lamination direction of the dielectric layers.

The first ceramic particles may include barium titanate ($BaTiO_3$)-based ceramics, lead complex perovskite-based ceramics, or strontium titanate ($SrTiO_3$)-based ceramics. The second ceramic particles may include barium titanate ($BaTiO_3$)-based ceramics, lead complex perovskite-based ceramics, or strontium titanate ($SrTiO_3$)-based ceramics.

The dielectric layers of the capacitive part may have a porosity of 1% or less.

The capacitive part may have a thickness of 50 µm to 2000 µm, and the protective layer may have a thickness of 10 µm to 100 µm.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
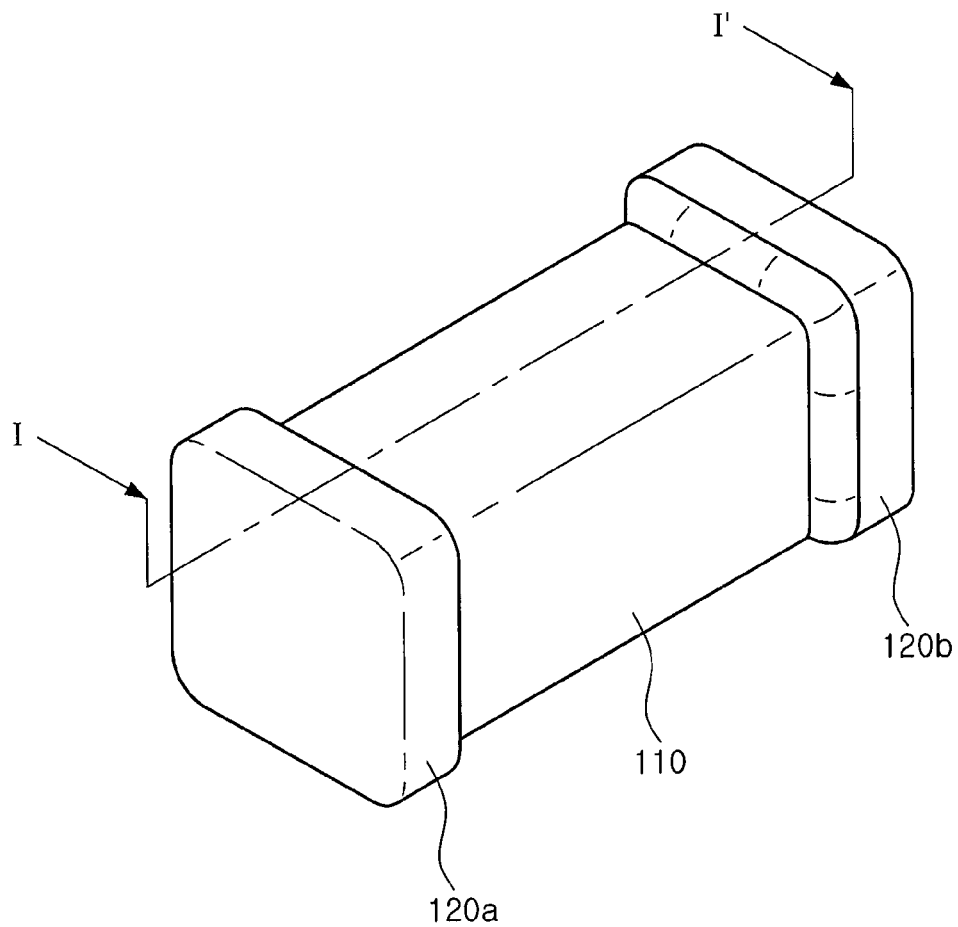
FIG. 1 is a schematic perspective view illustrating a multilayer ceramic capacitor according to an exemplary embodiment of the present invention.
Figure 2:
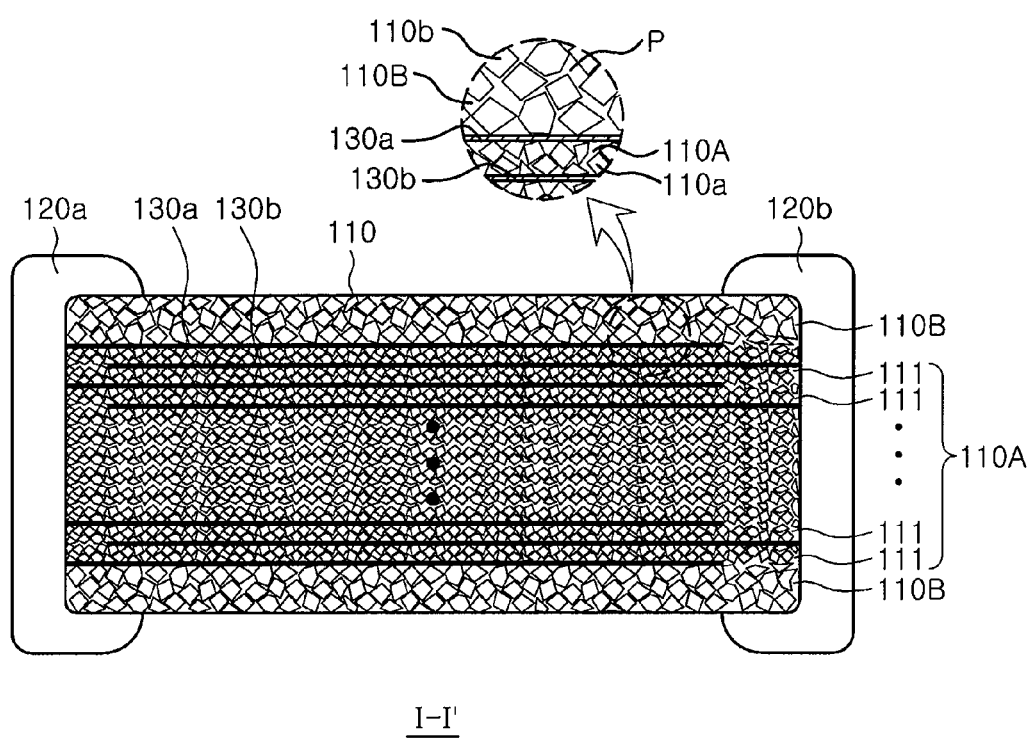
FIG. 2 is a schematic cross-sectional view taken along line I-I' of FIG. 1, illustrating the multilayer ceramic capacitor.

The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the thicknesses of layers FIG. 1 is a schematic perspective view illustrating a multilayer ceramic capacitor according to an exemplary embodiment of the present invention. FIG. 2 is a schematic cross-sectional view taken along line I-I' of FIG. 1, illustrating the multilayer ceramic capacitor.

Referring to FIGS. 1 and 2, a multilayer ceramic capacitor, according to this exemplary embodiment, includes a sintered ceramic body 110, first and second internal electrodes 130a and 130b formed inside the sintered ceramic body 110, and first and second external electrodes 120a and 120b electrically connected to the first and second internal electrodes 130a and 130b.

In FIG. 2, the sintered ceramic body 110 includes a capacitive part 110A, and protective layers 110B formed on the top and bottom surfaces of the capacitive part 110A.

The protective layer 110B may be formed on at least one of the top and bottom surfaces of the capacitive part 110A. The protective layers 110B, when formed on both the top and bottom surfaces of the capacitive part 110A, have excellent influence in lowering a crack occurrence rate.

The capacitive part 110A is obtained by laminating a plurality of ceramic dielectric layers 111 and the first and second internal electrodes 130a and 130b in an alternating manner. The first and second internal electrodes 130a and 130b are paired as having opposite polarities. These first and second internal electrodes 130a and 130b oppose each other in a lamination direction of the ceramic dielectric layers 111, and are electrically insulated from each other by the ceramic dielectric layers 111. One set of ends of the first internal electrodes 130a and the other set of ends of the second internal electrodes 130b are exposed in the lamination direction of the ceramic dielectric layers 111. The exposed ends of the first and second internal electrodes 130a and 130b are electrically connected to the first and second external electrodes 120a and 120b, respectively.

When a predetermined voltage is applied to the first and second external electrodes 120a and 120b, electric charges are accumulated between the opposing first and second internal electrodes 130a and 130b. Here, the capacitance of the multilayer ceramic capacitor is in proportion to the area of the opposing first and second internal electrodes 130a and 130b.

The ceramic dielectric layers 111 of the capacitive part 110A contain first ceramic particles having an average particle size D1 of 0.1 μm to 0.3 μm. The first ceramic particles 110a are not specifically limited, provided that they have a high dielectric constant. For example, the first ceramic particles 110a may utilize barium titanate ($BaTiO_3$)-based ceramics, lead complex perovskite-based ceramics, strontium titanate ($SrTiO_3$)-based ceramics or the like.

The first and second internal electrodes 130a and 130b are formed of a conductive metal, which may utilize, for example, Ni or a Ni alloy. The Ni alloy may contain Mn, Cr, Co or Al as well as Ni.

The first and second external electrodes 120a and 120b are formed of a conductive metal, and may contain, for example, copper.

The protective layer 110B is formed on at least one of the top and bottom surfaces of the capacitive part 110A. The protective layer 110B is formed of a ceramic material, and contains second ceramic particles whose average particle size ratio to the first ceramic particles 110a ranges from 1.1 to 1.3.

The second ceramic particles 110b are not specifically limited, provided that they have a high dielectric constant. For example, the first ceramic particles 110a may utilize barium titanate ($BaTiO_3$)-based ceramics, lead complex perovskite-based ceramics, strontium titanate ($SrTiO_3$)-based ceramics or the like.

Typically, a thermal expansion coefficient of a ceramic material reaches approximately 8 to $9 \times 10^{-6}/°C$., and internal electrodes, formed of nickel, have a thermal expansion coefficient of approximately $13 \times 10^{-6}/°C$. Thus, tensile and compressive stress acts on dielectric layers having a relatively small thermal expansion coefficient. Since the thermal expansion stress due to the thermal impact has its greatest influence on the interface between the protective layer 110B and the capacitive part 110A, a ceramic laminate having high brittleness may be cracked.

According to this exemplary embodiment of the present invention, the protective layer 110B includes the second ceramic particles 110B having a greater particle size than the first ceramic particles 110a. The second ceramic particles 110b, having a greater particle size than the first ceramic particles 110a, are slow in shrinkage behavior as compared to the first ceramic particles 110a. This alleviates a stress difference occurring at the time of the thermal expansion of internal electrodes.

An average particle size ratio (D2/D1, where D1 denotes the average particle size of the first ceramic particles 110a and D2 denotes the average particle size of the second ceramic particles 110b) of the second ceramic particles 110b to the first ceramic particles 110a ranges from 1.1 to 1.3. An average particle size ratio (D2/D1) of less than 1.1 fails to alleviate thermal impact occurring during the thermal expansion of internal electrode layers. This results in a high crack occurrence rate. An average particle size ratio exceeding 1.3 may cause non-firing or increase a crack occurrence rate.

Furthermore, the protective layer 110B includes a plurality of pores P, and the porosity thereof ranges from 2% to 4%. The protective layer 110B is formed by sintering a slurry which is a mixture of the second ceramic particles 110b, an organic binder and a solvent. The porosity of the protective layer 110B can be controlled by controlling the content of the second ceramic particles 110b, and the kind and amount of organic binder. The content of the second ceramic particles 110b may range from 15% to 40%.

The above-mentioned porosity range may enable the absorption of stress generated during the thermal expansion, thereby reducing a crack occurrence rate at the interface between the capacitive part 110A and the protective layer 110B.

A plurality of pores also exist in the capacitive part 110A, and the porosity of the capacitive part 110A may be 1% or less.

The protective layer 110B may be thicker than a single dielectric layer within the capacitive part 110A. For example, the single dielectric layer 111 of the capacitive part 110A may have a thickness of 2 μm or less. As 25 or more of such dielectric layers 111 are laminated, the thickness of the capacitive part 110A may range from 50 μm to 2000 μm. The protective layer 110B may have a thickness of 10 μm to 100 μm.

Hereinafter, a method of manufacturing a multilayer ceramic capacitor according to an exemplary embodiment of the present invention will be described.

First, a plurality of ceramic green sheets, which are to be laminated in a capacitance part, are prepared. The ceramic green sheets are manufactured by mixing first ceramic particles having an average particle size of 0.1 μm to 0.3 μm, a binder and a solvent to thereby produce a slurry and making this slurry into sheets having a thickness of a few micrometers by using a doctor blade method.

An internal electrode paste (i.e., a paste for the formation of an internal electrode) is applied to the surfaces of the ceramic green sheets to thereby form first and second internal electrode patterns. The first and second internal electrode patterns may be formed by using a screen printing method. The internal electrode paste is obtained by dispersing Ni or a Ni alloy powder in an organic binder and an organic solvent and making it into a paste state. The Ni alloy may contain Mn, Cr, Co or Al as well as Ni.

The organic binder utilized may be one that is known in the art. For example, the organic binder may utilize, but is not limited to, a binder such as a cellulose-based resin, an epoxy-based resin, an aryl resin, an acryl resin, a phenol-formaldehyde resin, an unsaturated polyester resin, a polycarbonate resin, a polyamide resin, a polyimide resin, an alkyde resin, a rosin ester or the like.

The utilized organic solvent may also be one that is known in the art. For example, the organic solvent may utilize, but is not limited to, a solvent such as butyl carbitol, butyl carbitol acetate, turpentine, α-terpineol, ethyl cellosolve, butyl phthalate or the like.

Thereafter, the ceramic green sheets provided with the first and second internal electrode patterns are laminated and pressurized in the lamination direction. Thus, the laminated ceramic green sheets and internal electrode paste are pressed with each other. In such a manner, a capacitive part, including the alternately laminated ceramic green sheets and internal electrode paste, is manufactured.

Subsequently, a plurality of ceramic green sheets, which are to be laminated on the top and bottom surfaces of the capacitive part, are prepared. These ceramic green sheets are manufactured by mixing second ceramic particles that are 1.1 to 1.3 times greater in average particle size than the first ceramic particles constituting the capacitive part, a binder and a solvent to thereby produce a slurry, and making this slurry into sheets having a thickness of a few micrometers by using a doctor blade method. Thereafter, the ceramic green sheets are laminated on the capacitive part to thereby form a protective layer. The porosity of the protective layer may be controlled by controlling the content of the second ceramic particles and the kind and amount of organic binder, and the porosity of the protective layer may range from 2% to 4%. The content of the second ceramic particles in the ceramic slurry may range from 15% to 40%.

Thereafter, a resultant ceramic laminate is cut into chips in units of one capacitor. At this time, the cutting is performed such that one set of ends of the first internal electrode patterns and the other set of ends of the second internal electrode patterns are exposed to the side surfaces thereof.

Thereafter, the laminate chip is fired at a temperature of 1200° C. for example, thereby manufacturing a sintered ceramic body.

At this time, since the second ceramic particles, having a greater particle size than the first ceramic particles, are slow in terms of shrinkage behavior, a difference in stress caused during the thermal expansion of the internal electrodes is alleviated.

Thereafter, first and second external electrodes are formed to cover the side surfaces of the sintered ceramic body and to be electrically connected to the first and second internal electrodes exposed to the side surfaces of the sintered ceramic body.

Subsequently, the surface of those external electrodes may be plated with nickel, tin or the like.

Multilayer ceramic capacitors were manufactured under conditions shown in Table 1 below. After the manufactured multilayer ceramic capacitors were subjected to thermal impact testing (dipping in a lead pot at 320 degrees Celsius for two seconds), the occurrence of cracks was evaluated using a microscope of 50 to 1,000 magnification.

TABLE 1

|  | Average particle size ratio (D2/D1) | Porosity (%) of protective layer | Sinterability | Crack occurrence rate |
| --- | --- | --- | --- | --- |
| Inventive example 1 | 1.1 | 2.0 | Sintered | 1/300 |
| Inventive example 2 | 1.2 | 3.2 | Sintered | 0/300 |
| Inventive example 3 | 1.3 | 4.0 | Sintered | 1/300 |
| Comparative example 1 | 0.8 | 0.8 | Sintered | 17/300 |
| Comparative example 2 | 0.9 | 1.0 | Sintered | 10/300 |
| Comparative example 3 | 1.0 | 1.4 | Sintered | 17/300 |
| Comparative example 4 | 1.4 | 5.7 | Sintered | 5/300 |
| Comparative example 5 | 1.5 | 6.3 | Non-sintered | 15/300 |

Referring to Table 1, comparative examples 1 to 3 show high crack occurrence rates since they fail to alleviate thermal impact occurring in the thermal expansion of internal electrodes. When the average particle size ratio of second ceramic particles to first ceramic particles exceeds 1.3 as in comparative example 4 and 5, a protective layer is not fired to thereby experience cracking or fails to alleviate thermal impact, thereby resulting in a high crack occurrence rate.

Inventive examples 1 to 3 show lower crack occurrence rates as compared to comparative examples 1 to 5.

As set forth above, in the multilayer ceramic capacitor according to exemplary embodiments of the invention, the protective layer includes second ceramic particles having a greater particle size than first ceramic particles constituting the dielectric layers of the capacitive part. The second ceramic particles are slower in terms of shrinkage behavior than the first ceramic particles. Accordingly, a stress difference caused in the thermal expansion of internal electrodes is reduced. Furthermore, the porosity of the protective layer ranges from 2% to 4% and thus the protective layer has a lower density than the capacitive part.

According to exemplary embodiments of the invention, the multilayer ceramic capacitor reduces thermal impact and shear stress applied thereto when the multilayer ceramic capacitor is mounted on the wiring board by using soldering or when the wiring board mounted with the multilayer ceramic capacitor is cut. Thus, a crack occurrence rate can be lowered.

While the present invention has been shown and described in connection with the exemplary embodiments, it will be apparent to those skilled in the art that modifications and variations can be made without departing from the spirit and scope of the invention as defined by the appended claims.

What is claimed is:

1. A multilayer ceramic capacitor comprising:
a capacitive part including dielectric layers and first and second internal electrodes alternately laminated therein, wherein the dielectric layers include first ceramic particles having an average particle size of 0.1 μm to 0.3 μm, and one set of ends of the first internal electrodes and one set of ends of the second internal electrodes are exposed in a lamination direction of the dielectric layers;

a protective layer formed on at least one of top and bottom surfaces of the capacitive part, including second ceramic particles and having a porosity of 2% to 4%, wherein an average particle size ratio of the second ceramic particles to the first ceramic particles ranges from 1.1 to 1.3; and first and second external electrodes electrically connected to the first and second internal electrodes exposed in the lamination direction of the dielectric layers.

2. The multilayer ceramic capacitor of claim 1, wherein the first ceramic particles comprise barium titanate ($BaTiO_3$)-based ceramics, lead complex perovskite-based ceramics, or strontium titanate ($SrTiO_3$)-based ceramics.

3. The multilayer ceramic capacitor of claim 1, wherein the second ceramic particles comprise barium titanate ($BaTiO_3$)-based ceramics, lead complex perovskite-based ceramics, or strontium titanate ($SrTiO_3$)-based ceramics.

4. The multilayer ceramic capacitor of claim 1, wherein the dielectric layers of the capacitive part have a porosity of 1% or less.

5. The multilayer ceramic capacitor of claim 1, wherein the capacitive part has a thickness of 50 μm to 2000 μm, and the protective layer has a thickness of 10 μm to 100 μm.

* * * * *

UNITED STATES PATENT AND TRADEMARK OFFICE
CERTIFICATE OF CORRECTION

PATENT NO. : 8,345,405 B2
APPLICATION NO. : 12/768993
DATED : January 1, 2013
INVENTOR(S) : Ji Hun Jeong et al.

Page 1 of 1

It is certified that error appears in the above-identified patent and that said Letters Patent is hereby corrected as shown below:

On the title page Item "(73) Assignee", please change

"Samsung Electronics Co., Ltd., Seoul (KR)" to

--Samsung Electro-Mechanics Co., Ltd., Suwon, Gyunggi-do (KR)--.

Signed and Sealed this
Fifteenth Day of October, 2013

Teresa Stanek Rea
*Deputy Director of the United States Patent and Trademark Office*